May 8, 1928.  1,668,747
H. N. WAYNE
SPRING SHACKLE FOR AUTOMOBILES AND THE LIKE
Filed Sept. 18, 1923   2 Sheets-Sheet 2
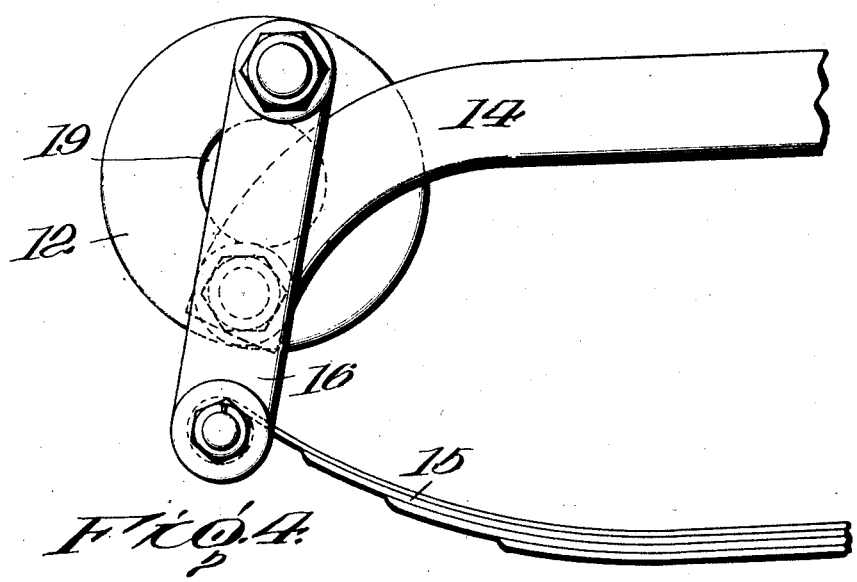
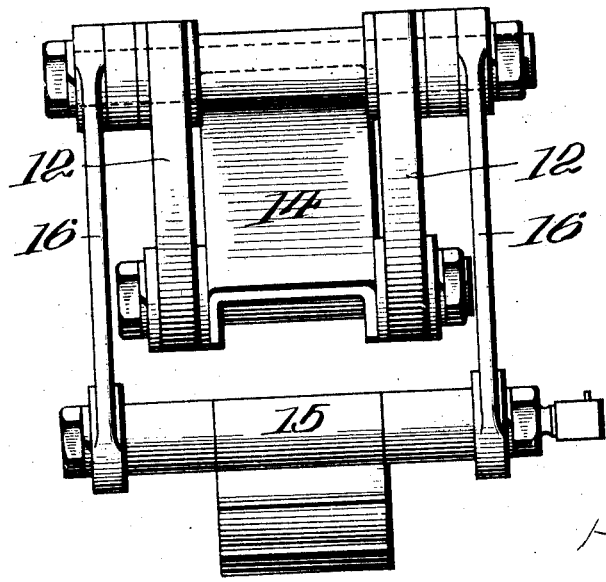
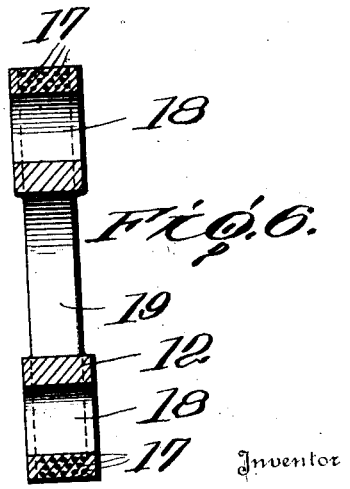
Inventor
Herbert N. Wayne
By Walter F. Rogers
his Attorney Patented May 8, 1928.

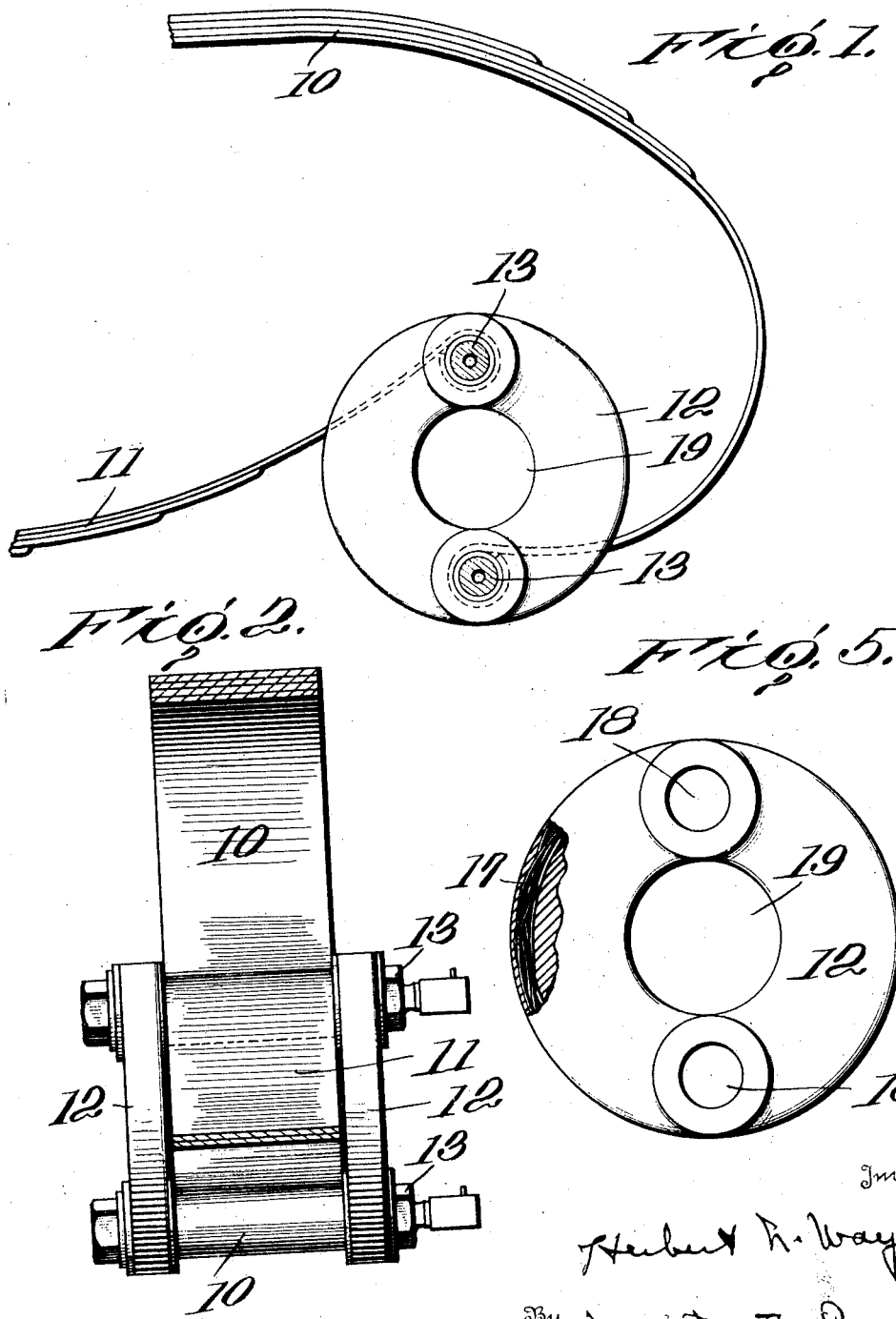

1,668,747

UNITED STATES PATENT OFFICE.

HERBERT N. WAYNE, OF SANTA MONICA, CALIFORNIA.

SPRING SHACKLE FOR AUTOMOBILES AND THE LIKE.

Application filed September 18, 1923. Serial No. 663,358.

This invention relates to an improvement in spring shackles, for automobiles and the like.

The invention consists in providing a flexible, elastic and expansible link, made of rubber or some similar material having a band of metal embedded therein which will govern the expansiveness of the link and limit it from stretching beyond a determined length.

The purpose and object of the invention is of a three fold capacity, as links of such construction when used for connecting the ends of elliptic, semi-elliptic, or three-quarter elliptic springs, will act as an elastic spring shackle to increase the cushion effect of the springs; as a nullifier or absorber of vibration between the unslung portion of the chassis (the wheels and axle) and the frame; and as an actual shock absorber by retarding the rebound effect of the springs.

The invention consists of certain novel features of construction and combinations of parts which will be hereinafter described and pointed out in the claims.

In the accompanying drawings:

Figure 1 is a view in side elevation showing the invention applied to three-quarter spring suspension of a vehicle;

Figure 2 is an end view thereof;

Figure 3, is a view in side elevation showing the application to a semi-elliptic spring construction;

Figure 4 is an end view thereof;

Figure 5 is a view in elevation of the link; and

Figure 6 is a cross-sectional view of the link.

In Figures 1 and 2 is shown one of the methods of applying the shackle link to the spring in which the ends of the springs 10 and 11 are joined together by shackle links 12, the shackle links being located in parallel relation and having the ends of the springs interposed therebetween, the links and springs being connected together by shackle bolts 13, 13.

In Figures 3 and 4 the shackle links 12 are applied to projecting ends 14 of the chassis frame and to the ends of the semi-elliptic spring 15. In this form the shackle links 12 are not connected directly to the spring 15 but metal links 16 are connected to the spring 15 and to the other terminals of the links 12.

It is evident that the shackle links 12 may be applied to the springs which arrangement is different from that shown in these figures. The shackle links 12 are composed of an elastic body preferably rubber, in which is embedded around the peripheral edge thereof a metallic band of wire braid of strands 17. Formed in the body and within the confines of the band 17 are two diametrically arranged holes 18, 18, through which the shackle bolts 13 pass in applying the links to the vehicle springs and frame. Central hole 19 is preferably formed in the body to afford better resiliency.

The metallic band 17 is sufficiently flexible to allow for the expansion and contraction of the elastic body of the shackle link, yet at the same time the band limits the expansion of the link. The band also affords a means of reinforcing the elastic body in eliminating the tearing or breaking of the body due to the strain applied thereto, due to the action of the springs preventing the shackle bolts from tearing through the body.

With a link of this character having a resilient body it will act as an absorber of vibrations and will cushion any shock applied thereto by retarding the rebound effect.

While I have described my invention as applied to a spring suspension of an automobile I do not wish to confine myself to that specific use alone, it being quite conceivable that a link of the character described may be used in many instances to better advantage than a rigid, non-elastic link.

Having described my invention what I claim is:

1. In a spring shackle, a link, comprising an expansible annular body having a flexible metal band around the edge thereof for limiting the expansion of the body.

2. In a spring shackle, a link, comprising an expansible body having a flexible metal band composed of wire strands embedded in the edge thereof for limiting the expansion of the body.

3. In a spring shackle, a link, comprising an elastic body having a metal band around the edge thereof for limiting the expansibility of the body, said body having a central hole and having spaced holes formed therein within the confines of the band and an opposite sides of the central hole for attaching the link.

4. In a shackle, a link comprising an elastic body having a central opening, a flexible band carried by said body adapted to limit elongation thereof; and means for mounting said link engageable therewith on opposite sides of the center thereof.

HERBERT N. WAYNE.